3,417,038
PLASTIC FOAM PRODUCTION
Kenneth J. Soltys, Secane, Pa., assignor to Air Products and Chemicals, Inc., Philadelphia, Pa., a corporation of Delaware
No Drawing. Filed Apr. 6, 1965, Ser. No. 446,073
The portion of the term of the patent subsequent to Aug. 30, 1983, has been disclaimed
2 Claims. (Cl. 260—2.5)

ABSTRACT OF THE DISCLOSURE

Plastic foams are prepared from precursors comprising blowing agents adapted to pre-distribute the foaming gas for a potential expansion from 4 to 40 times the unexpanded volume, the uniformity of cell size being enhanced by use of a terpolymer comprising vinyl pyrrolidone as the surfactant.

---

This invention relates to the preparation of plastic foam and particularly to an improvement comprising a method of promoting the formation of smaller cell size, and the promoting of more uniform cell size, by using a stabilizer featuring a copolymer of vinyl pyrrolidone. Pure polymeric polyvinylpyrrolidone is excluded, but products resulting from the polymerization of mixtures of polymerizable materials comprising significant (i.e. more than 17%) vinyl pyrrolidone provide the oils imparting the desired stabilizing action to precursors for plastic foams.

Several methods are available for the manufacture of plastic foam. Such plastic foam has a density which is significantly less than the density of the same structural material free from pores. The term "precursor" embraces any and all stages of composition which eventually is transformed into the plastic foam composition. In some initial steps, the precursor has sufficiently great plasticity and/or low viscosity to permit rapid, simple mixing of appropriate ingredients with whatever is the initial ingredient. The precursor is subjected to a series of steps, usually comprising heating and then cooling to ambient temperature, to cure it into a plastic foam having greater structural strength and/or permanence of structure than the precursor during the mixing steps.

During curing, the transformation to a material in which the pores become permanent instead of transient, can be described as a great increase in viscosity of the precursor. This viscosity increase during curing may require a relatively large number of steps of chemical reactions (as in preparing polyurethane foam). The foaming may require the volatilization of a liquid from the precursor (as in conventional polystyrene foam production). Plastic foam features generally small pores having dimensions less than about 1 mm., and thus is distinguished herein from plastic sponge, in which large pores, such pores having a dimension in the range from about 2 mm. to about 20 mm., are acceptable. Low cost disposable products such as flower supports andl packaging cushions, generally employ such plastic sponge instead of the plastic foam preferred for insulation, cushioning, clothing, and a variety of other products. In all methods of making plastic foam, the problems connected with preventing development of bubbles (pores larger than about 1 mm. diameter) and/or preventing the dissipation of gas from the precursor are among the most significant difficulties faced by the process engineer.

Because different plastics have different densities, it is sometimes convenient to describe plastics having pores by the ratio of the density of the solid plastic to the density of the sample having pores, sometimes called the expansion ratio. Two plastic foams having substantially the same number of pores per volume, same expansion ratios, same uniformity of pores, etc., might have different densities merely because the densities of the respective solid compositions differed. Plastic products having expansion ratios within a range from about 1.1 to about 4 and those having expansion ratios from about 40 to about 200 have been employed to some extent in industrial products. However, a high proportion of the most used expanded plastics have had expansion ratios within the range from about 4 to about 40. The difficulties in achieving small uniform pore size increase significantly as the expansion ratio is increased from 4 to 40.

The choice of technique for making an expanded plastic product is dependent upon a variety of factors including the desired expansion ratio, the type of plastic, the expected duration of the production run, the amount of equipment available, and the like. Some of the better known techniques can be briefly summarized.

Polystyrene is sometimes made by heating solid beads containing dissolved pentane as a blowing agent adapted to volatilize when heated, and this approach exemplifies a liquid blowing agent technique.

By the froth technique, a gas is dissolved and dispersed in the precursor under superatmospheric pressure, and thereafter the precursor is allowed to expand in a zone having less than the peak pressure. Hot thermoplastic froth is converted to plastic foam by cooling to about room temperature. Although the marginal cost for producing additional marginal amounts of plastic foam by the froth technique are attractively small, the cost for the factory of a size permitting efficient use of the froth technique involves such a large capital outlay that only a small proportion of the plastic foam is manufactured in this manner.

A chemical compound which releases gas when thermally decomposed can be relied upon to produce the pores in a plastic foam. In both the froth technique and the technique relying upon a chemically decomposable blowing agent, the nuclei for pore formation are already distributed throughout the precursor. The term "pre-distribution of gas" embraces frothing and the utilization of thermally decomposable blowing agents, but excludes multistep chemical curing (e.g. polyurethane).

In the manufacture of plastic foams by pre-distribution of gas, it is generally easy to control the formulation to obtain relatively high density plastic foams such as 500 grams per liter or 600 grams per liter, requiring expansion ratios such as 1.3 to 3, but difficulty has been experienced in achieving uniform pore size in products having an expansion ratio in the 4 to 40 range. In a significant portion of the marketing of plastic foams, the product is purchased on a volume basis, so that there has been a continuing effort to produce products having the lowest density attainable without undue sacrifice of properties such as tensile strength, compression set, and resiliency. Preferred embodiments of the invention are concerned with expansion ratios from about 4 to 40, and with plastics having densities as solids within the range from about 0.8 to about 3 g./ml.

Heretofore, foam plastic technologists have recognized that minor ingredients, conveniently designated herein as stabilizers, but called by any of a variety of terms in prior literature, affect the ability of precursors to expand to an appropriate size and then undergo a viscosity increase and curing instead of collapsing. The effectiveness of stabilizers in diminishing the likelihood of collapse of the expanded precursor has sometimes been attributed to a particular property of formulations falling within a narrow range, but the inconsistencies amongst different systems have strengthened the interpretation that empirically demonstrated success for a stabilizer has far greater signifcance than any of the conflicting theories attempting to explain why a stabilizer for plastic foam might be effective.

The present invention is concerned with a plastic foam prepared by processing a precursor characterized by the presence of a major amount of plastic-forming ingredients, an amount of pore-forming material correlated with the contemplated density of the plastic foam, and a minor amount of a stabilizer consisting of a copolymer having a viscosity within the range from 60,000 to 300,000 centipoises derived from a mixture of monomers comprising a significant proportion (from 17% to 83%) of vinylpyrrolidone and one or more other monomers.

The nature of the invention is further clarified by reference to a plurality of examples.

EXAMPLE 1

A multipolymer is prepared by mixing ingredients as follows:

| | | |
|---|---|---|
| N-vinylpyrrolidone | 34.4 kg | 22.1 mol. percent. |
| Vinyl acetate | 53.6 kg | 22.1 mol. percent. |
| Dibutyl maleate | 70.8 kg | 44.2 mol. percent. |
| Nonylphenylpolyethoxyethanol | 65.4 kg | 8.8 mol. percent. |
| Dodecyl mercaptan | 7.4 kg | 2.7 mol. percent. |
| Azobisisobutyronitrile | .28 kg | 0.1 mol. percent. |

A series of copolymeric products were prepared by complying with the above proportions. The dodecyl mercaptan and nonylphenylpolyethoxyethanol serve as chain transfer agents. The nonylphenylpolyethoxyethanol also serves as a solvent promoting the development of more uniform distribution of size of the polymer molecules than might result in the absence of a diluent type solvent. In preparing each polymer, at least one third of the nonylphenylpolyethoxyethanol was the initial solvent, into which the other ingredients were mixed. The preparation of multipolymers includes the heating of the reaction mixture in a resin kettle. A solution of the azobisisobutyronitrile catalyst in the remaining nonylphenylpolyethoxyethanol was added periodically at a rate generally increasing with time during about three hours. The temperature of the reaction mixture in the resin kettle (equipped with reflux condenser) was kept within the polymerization range (i.e. from about 75° C. to about 90° C.) for approximately one hour subsequent to the addition of the last amount of catalyst. The polymerization is desirably quenched by addition of sufficient cold methanol to cool the mixture to about 50° C. The alcoholic groups tend to combine with any remaining unsaturated group so that further co-polymerization of the viscous oil does not readily occur.

Thereafter all volatile components, including any methanol employed as quenching agent, were removed by vacuum flushing. The viscous oil is heated under vacuum to a temperature of at least 50° C., and desirably about 70° C., to remove volatilizable components such as unreacted vinyl acetate or methoxyethyl acetate. The oil remaining after such vacuum purification has a viscosity within the range from about 60,000 to about 300,000 centipoises and is conveniently designated as a multipolymer derived from monomers including significant amounts of vinylpyrrolidone, or still more simply as a vinylpyrrolidone-derived multipolymer.

A plastic foam is prepared by mixing:

| | Kg. |
|---|---|
| Polyvinylchloride resin VR 53 | 50 |
| Dioctylphthalate | 40 |
| Vinylpyrrolidone multipolymer | 1 |
| Lead stabilizers | 1 |
| Azodicarbonamide | 1 |

The formulation was spread as a thin film on an aluminum foil tray and heated at 200° C. for about 10 minutes. In this manner, a test sample of plastic vinylchloride foam was prepared and its density was measured as about 10 pounds per cubic foot or about 160 grams per liter.

The blowing agent known as azodicarbonamide is believed to have a formula $H_2NCONNCONH_2$. Except for the use of the vinylpyrrolidone derived copolymer, the formulation and procedure for making the 160 g./l. polyvinylchloride foam were conventional. The use of the vinylpyrrolidone copolymer oil imparted smaller and more uniform pore size (best seen by microscopic examination of a cross-section) than was obtained with the control sample identically prepared except that the vinylpyrrolidone copolymer was omitted.

When plasticizers are admixed with other components, no chemical reaction occurs, but when relatively long (e.g., more than 3 carbon) chains are chemically bonded along a polymeric chain, the copolymer is sometimes designated as being "internally plasticized." An oil having such chemically bound side chains has properties not found in an oil consisting of only linear chains. Such modification is conveniently designated as "internal plasticizing" even though the polymer has too low a molecular weight to require conventional plasticizers. In the preparation of an internally plasticized polymeric material (homopolymers, copolymers, heteropolymers, multipolymers, etc.) monomers such as dibutyl maleate can provide the sidechains effective in modifying polymeric properties. Important advantages are achieved by having a high weight ratio of plasticizing components to pyrrolidone components in the mixture of monomers. Vinyl acetate is one of the cheapest available vinyl monomers, and to the extent that it can be used as an extender without impairing the effectiveness of the vinylpyrrolidone copolymer as a stabilizer imparting uniform cell size to plastic foams, it helps to reduce the cost of such stabilizer.

EXAMPLE 2

A resin kettle is employed in the preparation of a copolymer consisting of:

| | Kg. |
|---|---|
| Vinyl acetate | 16.5 |
| N-vinylpyrrolidone | 10.7 |
| Dibutylmaleate | 21.9 |
| Nonylphenylpolyethoxyethanol | 50.9 |
| Total | 100 |
| Azobisisobutyronitrile | 0.48 |

The catalyst was dissolved in about two-thirds of the nonylphenylpolyethoxyethanol and increasingly larger aliquots were added at intervals of about every 5 minutes during the first three hours of heating at 70° C. The reaction mixture was maintained at about 70° C. for an additional hour of copolymerization. The copolymer was flash distilled under vacuum at about 70° C. to remove unreacted vinyl acetate and/or other unreacted monomers or chain transfer agent. After vacuum flashing the product had a viscosity of about 132,000 centipoises at room temperature.

A polyvinylchloride foam was prepared by admixture of the following composition:

| | G. |
|---|---|
| Polyvinylchloride (Exon 605) | 200 |
| Dioctylphthalate | 106 |
| Butylbenzyl phthalate (Santicizer 160) | 47 |
| Heat stabilizer (Ferro 1720) | 6 |
| Light stabilizer (Ferro 900) | 4 |
| Heat decomposable blowing agent (Kempore SD. 125) | 48 |
| Vinylpyrrolidone copolymer (supra) | 3 |

The composition was cured at 200° C. for 15 minutes and produced a foam having a density of 4.5 pounds per cubic foot. The blowing agent is a 50% dispersion of 11 azobisformamide in dioctylphthalate.

EXAMPLE 3

The procedure of Example 2 was followed except that the quantity of Kempore SD 125 was 25% less. The resulting foam had a density of 5.6 pounds per cubic foot.

EXAMPLE 4

A polyvinylpyrrolidone heteropolymer is prepared by the admixture of the following components:

| Mol. percent | Mols | Component | Grams |
|---|---|---|---|
| 55.5 | 0.5 | N-vinyl pyrrolidone | 55.5 |
| 22.2 | 0.2 | n-Octyl acrylate | 36.8 |
| 22.2 | 0.2 | Vinyl butyrate | 21.6 |
| | 1.5 | Acetone | 87.0 |
| | | Catalyst for vinyl polymerization | 3.0 |

The n-octyl acrylate is an alkyl ester of an unsaturated acid, adapted to impart internal plasticizing to the copolymer. Vinyl butyrate is both an extender and an internal plasticizer. About 87 g. of acetone (equal to about 76% of the weight of the monomers) is included in the reaction mixture during the polymerization for the purpose of decreasing the viscosity of the system and for modifying the reflux condenser action. The acetone is removed by the vacuum distillation at 23 mm. absolute pressure and about 95° C., such vacuum flashing also removing unreacted components.

The resulting high viscosity internally plasticized polyvinylpyrrolidone having a viscosity of about 200,000 centipoises at room temperature is employed as a stabilizer in the preparation of foams from a plastisol of polyvinylchloride, and is shown to promote the formation of more uniform cell size than in equivalent compositions omitting such stabilizer.

EXAMPLE 5

Foam rubber products are prepared using the internally plasticized polyvinylpyrrolidone oil of Example 1 as a stabilizer whereby the pore size is more uniform than in the absence of such stabilizer.

EXAMPLE 6

A polystyrene foam is prepared using pentane as the blowing agent and featuring 2% of the vinylpyrrolidone copolymer of Example 4 as a stabilizer. The product has smaller and more uniform pores than a control product omitting such stabilizer. Moreover, the product prepared by the use of the vinylpyrrolidone copolymer as a stabilizer features smaller and more uniform pores than a sample of commercially marketed polystyrene.

EXAMPLE 7

Carbon dioxide is dispersed into molten polypropylene at a pressure of about 8000 p.s.i.g., and the plastic froth is ejected into normal atmospheric pressure through a froth nozzle. In comparative tests to determine the effect of the internally plasticized polyvinylpyrrolidone as a stabilizer, the product prepared with 1% such stabilizer features a lower density, more uniform pore size, and smaller pore size than the control product.

EXAMPLE 8

A plastic foam is prepared following the general procedure of Example 1 but substituting 4.5 kilograms of azodicarbonamide instead of 1 kilogram. After curing at 200° C., the vinyl foam is satisfactory and has density of about 9 pounds per cubic foot or about 144 grams per liter.

EXAMPLE 9

A plastic foam is prepared having a density of about 4.5 pounds per cubic foot or about 72 grams per liter. This density product is attained by using about 12 kilograms of the thermally decomposable pore forming agent and about 5 kilograms of the internally plasticized polyvinylpyrrolidone, but otherwise proceeding in accordance with Example 1. The quantity of polyvinylpyrrolidone stabilizer employed must be within the range from 0.5 to 6% by weight of the components forming the structural body of the plastic foam.

EXAMPLE 10

A series of internally plasticized polyvinylpyrrolidone oils are prepared following the general procedure of Example 1 but varying the concentrations of the monomers within the range from about 17% to about 67%. Each of the oils is shown to have value as a foam stabilizer. In control tests it is shown that oils prepared by polymerization of any of the three components is unsatisfactory as a foam stabilizer. At least one of the monomers other than pyrrolidone has a side chain of more than three carbon atoms. An alkyl ester of an unsaturated acid such as maleic, fumaric acid, acrylic acid, crotonic acid, or the like, can impart desired properties if the alkyl group has at least 4 carbon atoms but less than 9 carbon atoms. Inasmuch as vinylpyrrolidone is the most expensive of the monomers, it is advantageous (but not essential) to dilute the monomeric mixture with a low cost vinyl ester such as vinyl acetate. In preferred embodiments, the vinylpyrrolidone portion of the polymer is believed to exert an enhanced beneficial effect upon the stabilizer because the vinylacetate groups provide additional spacing of the pyrrolidone groups from each other along the chain.

EXAMPLE 11

Although the internally plasticized polyvinylpyrrolidone is especially advantageous in the preparation of polyvinyl foams, it is also useful in the preparation of other varieties of plastic foams by any of a variety of techniques. Some of the plastic foams which can be prepared in accordance with the present invention include those derived from polymethacrylate, epoxy resins, phenol-formaldehyde resins, and polyperfluoropropylene plastics. Some plastics readily form plastisols analogous to some of the vinyl chloride plastisols, but the plastisol approach is not essential to benefitting from the superior stabilizing action of the present invention.

One of the methods for making plastic foam is designated as the froth technique. The copolymer of vinylpyrrolidone is useful as a stabilizer in preparing plastic foam by the froth technique. Such stabilizing activity is believed to be attributable predominantly to the action of the pyrrolidone group along the chain of the copolymer. The grouping employed for extending the chain (such as vinyl acetate or other vinyl ester of a lower saturated acid) enhances the solubility of the copolymer in the precursor employed in making the plastic foam. In the ester of the unsaturated ester, the alkyl groups having from 4 to less than 9 carbon atoms impart a plasticizing property to the oil and modify the viscosity and dispersion characteristics of the stabilizer. The preparation of polyvinylchloride foam represents a preferred embodiment of the invention, but any of a great variety of plastics susceptible to expansion ratios within the range of about 4 to 40 may be employed. The general nature of the method is such that it concerns the making of a plastic foam featuring an expansion unit ratio within the range from 4 to 40 in which method there is distributed throughout a precursor a component other than the polymer formers which component is adapted to provide spaced apart nuclei suitable for growth into pores of gas, which pores expand the precursor. The present invention is particularly concerned with the improvement which consists of incorporating in the precursor at least 0.5 but less than 6% of a liquid copolymer of vinylpyrrolidone having a viscosity within the range from about 60,000 to about 300,000 centiposes and prepared by the copolymerization of a plurality of monomers including from 17 mol. percent to 83 mol. percent vinyl pyrrolidone. Among the monomers which can copolymerize with the vinylpyrrolidone are an alkyl ester of an unsaturated acid, the alkyl group having at least 4 but less than 9 carbon atoms and the vinyl ester of a lower saturated acid. Some preferred copolymers contain from 17 mol. percent to 67 mol. percent of each of the three types of monomers. The stabilizing oil obtained by such copolymerization of vinylpyrrolidone and at least one other monomer modifies the precursor in such a manner as to promote more uniform pore size than would be attainable in its absence, and modifies the precursor to permit retention of a significant portion of the gas available for plastic foam formation.

EXAMPLE 12

A formulation consisting of:

|  | G. |
|---|---|
| Polyvinylchloride (Exon 605) | 100 |
| Dioctylphthalate plasticizer | 63.5 |
| Butyl benzylphthalate plasticizer | 23.5 |
| Antioxidants, etc. (Ferro 900 and 1720) | 5 |
| Azodicarbonamide | 11 |
| Vinylpyrrolidone copolymer Ex 4 | 1.5 | was spread on an aluminum foil as a 40 mil layer and cured at 200° C. for 9 minutes to provide a vinyl foam of about 100 g./l. density and featuring small uniform pores. A product prepared without the stabilizer was objectionable because of bubbles and nonuniformity of pores. A product prepared using 2 g. of the stabilizer of Example 1 (comprising the nonylphenylpolyethoxy-ethanol diluent) showed that the Example 1 stabilizer was superior to the one omitting such diluent. Vinyl foam prepared using only the nonylphenylpolyethoxyethanol as a stabilizer was especially unsatisfactory, indicating that the combination achieved some mutual enhancement of stabilizing properties.

Obviously many modifications and variations of the invention as hereinbefore set forth may be made without departing from the spirit and scope thereof, therefore only such limitations should be imposed as are indicated in the appended claims.

What is claimed is:

1. In the use of a foam stabilizer oil prepared by the exhaustive catalytic copolymerization of a precursor composition consisting predominantly of a plurality of monomers having polymerizable ethylenic groups, from 17 to 67 mol percent of the monomers being vinyl pyrrolidone, from 17 to 67 mol percent of the monomers being dibutyl maleate, and from 17 to 67 mol percent of the monomers being vinyl acetate, said precursor composition containing chain transfer component selected from the group consisting of nonylphenylpolyoxyethyleneethanol and dodecylmercaptan, said chain transfer component being adapted to restrict the copolymerization reaction, and said foam stabilizer being effective in modifying precursors for plastic foam to permit retention of a high proportion of the gas volume generated during foam formation the improvement which consists of preparing a mixture characterized by the presence of polyvinyl chloride resin, blowing agents providing predistribution of the foaming gas, plasticizer, and said foam stabilizer oil, the foam stabilizer oil constituting from 1% to 6% by weight of the mixture; supplying heat to a curing zone for curing said mixture at conditions providing an expansion ratio within the range from 4 to 40 to provide a polyvinyl chloride foam having a density lower than and a pore size uniformity better than in polyvinyl chloride foam prepared without said foam stabilizer; and cooling said polyvinyl chloride foam.

2. In the use of a foam stabilizer oil prepared by exhaustive catalytic co-polymerization of a precursor composition consisting predominantly of a plurality of monomers having polymerizable ethylene groups, from 17 to 67 mol percent of the monomers being vinyl pyrrolidone, from 17 to 67 mol percent of the monomers being dibutyl maleate, and from 16 to 67 mol percent of the monomers being vinyl acetate, said precursor composition containing at least one chain transfer component selected from the group consisting of nonylphenylpolyoxyethyleneethanol and dodecylmercaptan, said chain transfer component being adapted to restrict the co-polymerization reaction, and said foam stabilizer being effective in modifying precursors for plastic foam to permit retention of a high proportion of the gas volume generated during foam formation, the improvement which consists of: preparing a plastic foam precursor characterized by the presence of a major amount of uncured polymeric structure compositions, a blowing agent providing predistribution of the foaming gas, the concentration of the blowing agent providing a potential expansion unit ratio within the range from 4 to 40, and an amount of said foam stabilizer oil constituting from 1% to 6% by weight of the mixture; supplying heat to a curing zone for curing said plastic foam precursor at conditions providing an expansion ratio within the range from 4 to 40 to provide a plastic foam having a density lower than and a pore size uniformity better than in plastic foam prepared without said foam stabilizers; and cooling said plastic foam.

References Cited

UNITED STATES PATENTS

| 3,061,558 | 10/1962 | Alter | 260—2.5 |
| 3,270,032 | 8/1966 | Erner | 260—2.5 |
| 3,288,729 | 11/1966 | Waterman et al. | 260—2.5 |

MURRAY TILLMAN, *Primary Examiner.*

J. C. BLEUTGE, *Assistant Examiner.*

U.S. Cl. X.R.

260—31.8, 32.6, 895